United States Patent [19]

Giroux

[11] 4,040,310

[45] Aug. 9, 1977

[54] HYDRAULIC TORQUE CONVERTING WHEEL

[76] Inventor: Pierre Giroux, 3156 de Francheville Street, Trois-Rivieres, Canada

[21] Appl. No.: 636,619

[22] Filed: Dec. 1, 1975

[51] Int. Cl.² .............................................. F16H 47/08
[52] U.S. Cl. ....................................... 74/688; 74/720; 74/730
[58] Field of Search ................. 74/751, 688, 794, 730, 74/720, 720.5; 60/332, 342, 354, 355

[56] References Cited

U.S. PATENT DOCUMENTS

| | | | |
|---|---|---|---|
| 2,441,818 | 5/1948 | Jandasek | 60/355 |
| 2,900,845 | 8/1959 | Tielens | 74/688 |
| 3,186,172 | 6/1965 | Angell | 60/355 |
| 3,511,113 | 5/1970 | Rheault | 74/794 |
| 3,587,345 | 6/1971 | Johnson | 74/751 X |

FOREIGN PATENT DOCUMENTS 1,372,123   8/1964   France .................................. 74/751

Primary Examiner—Samuel Scott
Assistant Examiner—Lance W. Chandler

[57] ABSTRACT

The combination of a hydraulic torque converter and planetary gear system in a wheel hub characterized in that the selective speed control of an individual wheel is achieved through the hydraulic torque converter, thereby obviating the need of gear shifting as in the anterior combinations. This hydraulic torque converting wheel includes a spindle, a tight casing rotating on the spindle and sealed relative to the latter, a rim surrounding the casing and forming a wheel hub therewith, a planetary gear system including an input gear, a planet carrier, planet gears and a first and a second output gears, torque converting blades and fins mounted inside the rotatable casing, the input gear drives the planet carrier and the planet gears which drive the blades through the first output gear and the casing through the second output gear; the blades drive the casing by torque converting cooperation with the fins, and a selective speed control is connected to the blades to rotate the latter relative to the fins and thus change the torque converting relationship therewith.

12 Claims, 6 Drawing Figures

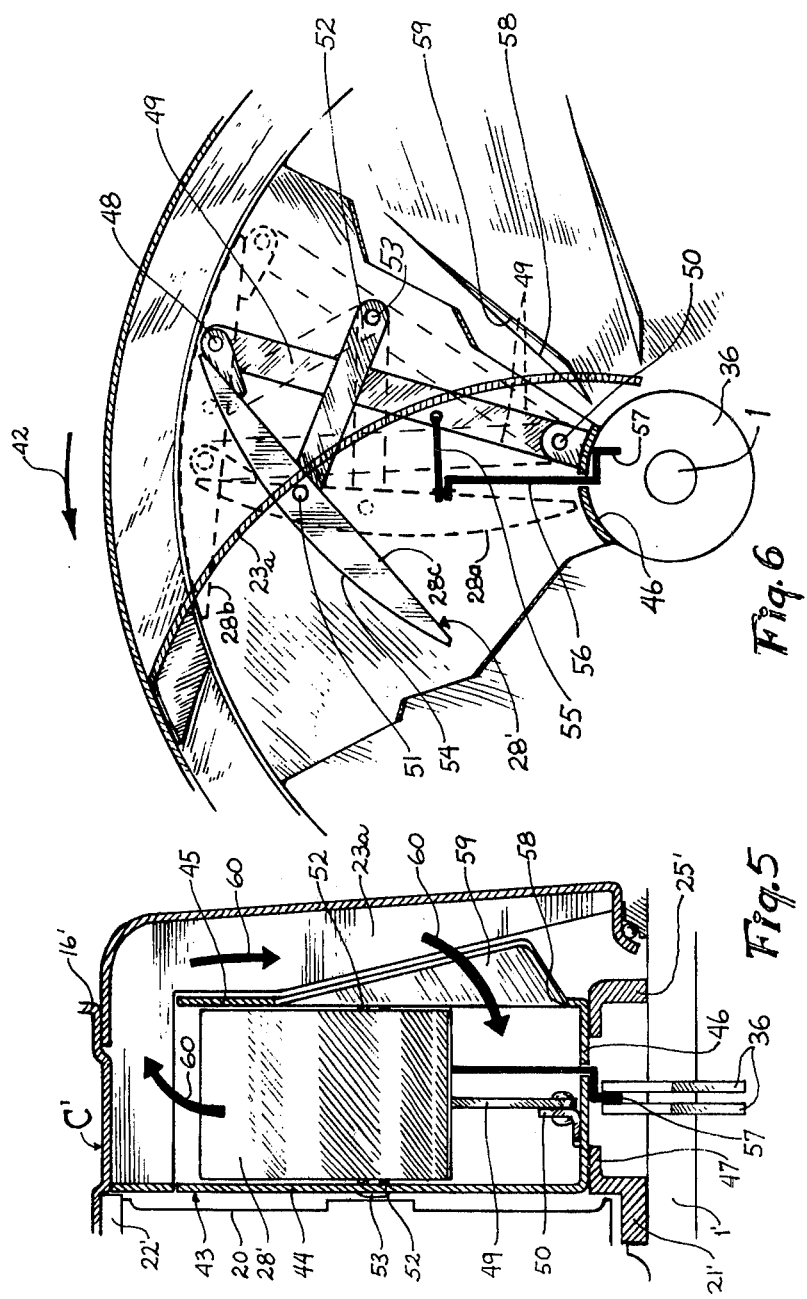

4,040,310

HYDRAULIC TORQUE CONVERTING WHEEL

This invention relates to a hydraulic torque converter and, more particularly, to a hydraulic torque converter in combination with a wheel.

It has been proposed in the prior art to combine a planetary gear system with a hydraulic torque converter; however, there has not been proposed in such combination to use the torque converter rather than the planetary gear system to effect selective speed control. The use of the planetary gear system to effect selective speed control imposes gear shifting to pass from one speed range to another.

It is a general object of the present invention to provide a combination of a planetary gear system and hydraulic torque converter wherein there is no gear shifting required to pass from neutral to maximum speed.

It is another general object of the present invention to provide a combination of a planetary gear system and hydraulic torque converter wherein the selective speed control is done through control of the hydraulic torque converter.

It is a further general object of the present invention to provide a planetary gear system and a hydraulic torque converter in combination with a wheel hub and thence to produce a hydraulic torque converting wheel which is particularly suitable for use as the traction wheel of a bicycle, motorcycle, cyclomotor, or snowmobile.

It is a more specific object of the present invention to provide a hydraulic torque converting wheel wherein selective control is easily and readily done through the hydraulic torque converter without gear shifting.

The above and other objects and advantages of the present invention will be better understood with the following detailed description of a preferred embodiment thereof which is illustrated, by way of example, in the accompanying drawings, wherein:

FIGS. 5 and 6 are partial axial-section and cross-section respectively of a second embodiment.

Figure 1:
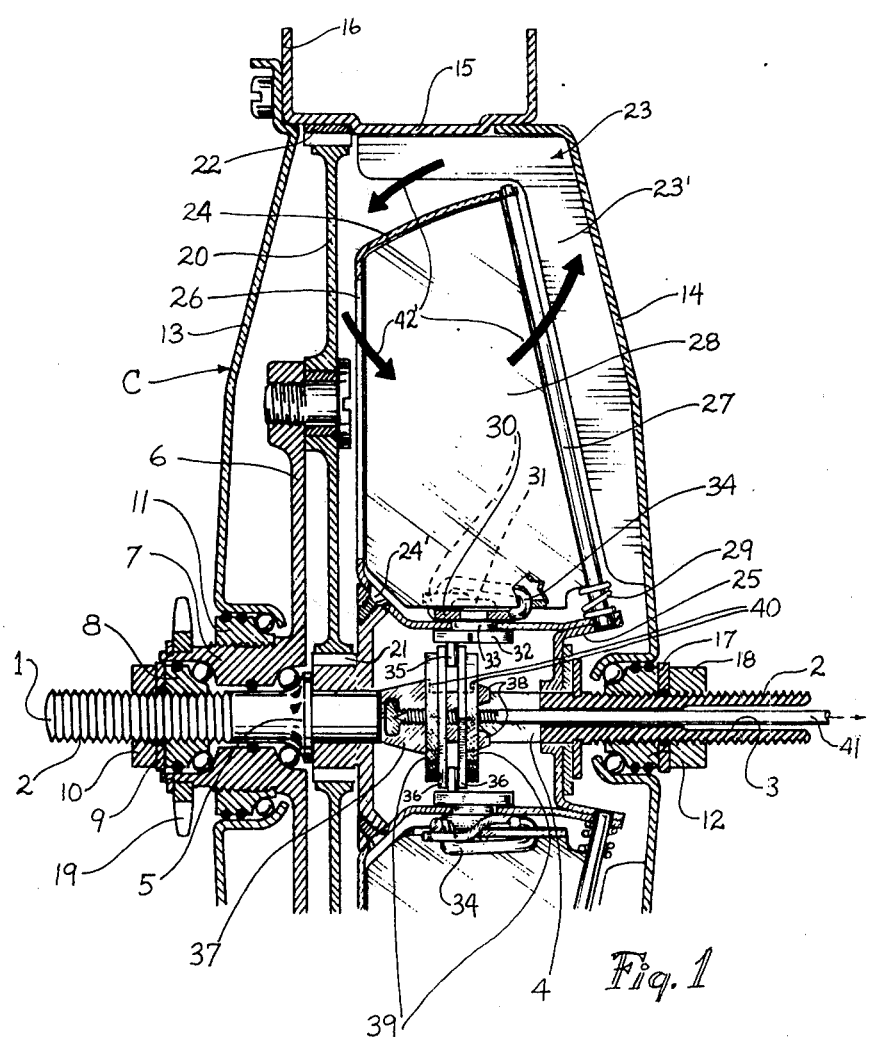
FIG. 1 is a partial axial section of a wheel hub assembly adapted to form a hydraulic torque converting wheel according to the present invention.

The illustrated hydraulic torque converting wheel hub assembly is particularly adapted to form the wheel hub for the traction wheel of a bicycle. The illustrated wheel hub assembly includes a spindle 1 having screw threads 2 at each end and an open end forming a central axial passage 3 having an inner end substantially midway between the ends of the spindle 1. The latter is also formed with a diametrical slot 4, the purpose of which will be better explained later.

The spindle 1 is appropriately shouldered at 5 to form an inner ball bearing race. A planet carrier 6 includes a hub portion 7 which forms a pair of axially spaced-apart outer ball bearing races rollably cooperating with the inner ball bearing race formed by the shoulder 5 and also cooperating with the inner ball bearing race defined by the removable ring member 8. The latter is conventionally held fast by a washer 9 and a flat nut member 10.

A casing C is rotatably mounted relative to the spindle 1 by means of a pair of ring members 11 and 12 forming inner ball bearing races screwed onto the hub portion 7 of the planet carrier 6 and onto the threaded portion 2 at the opposite end of the spindle. This casing C includes axially opposite sides 13 and 14 and a peripheral rim 15 of U-shape cross-section forming the outer rim of a wheel hub for a bicycle. The axially spaced-apart flanges 16 are provided to conventionally hook the usual spoke wires of a bicycle wheel thereto. As shown in particular in FIG. 1, O-ring seals are provided at the rotation interfaces to produce a liquid-tight casing. The ring member 12 is also held fast by a washer 17 and a nut 18.

Thus, the hub portion 7 of the planet carrier extends outwardly of the casing. An input pinion 19 is fixed onto the outward projection of the hub portion 7 for bodily rotation therewith and to thus drive the internal planet carrier 6. Planet gears 20, for instance 3, are rotatably carried by the planet carrier 6 for free rotation relative to the latter. A first output gear 21 is rotatably mounted on the spindle 1 in meshing engagement with the planet gears 20 which surround it. A second output gear 22 is fixedly secured against the internal face of the rim 15 in meshing engagement with the planet gears 20 which it surrounds.

Figure 2:
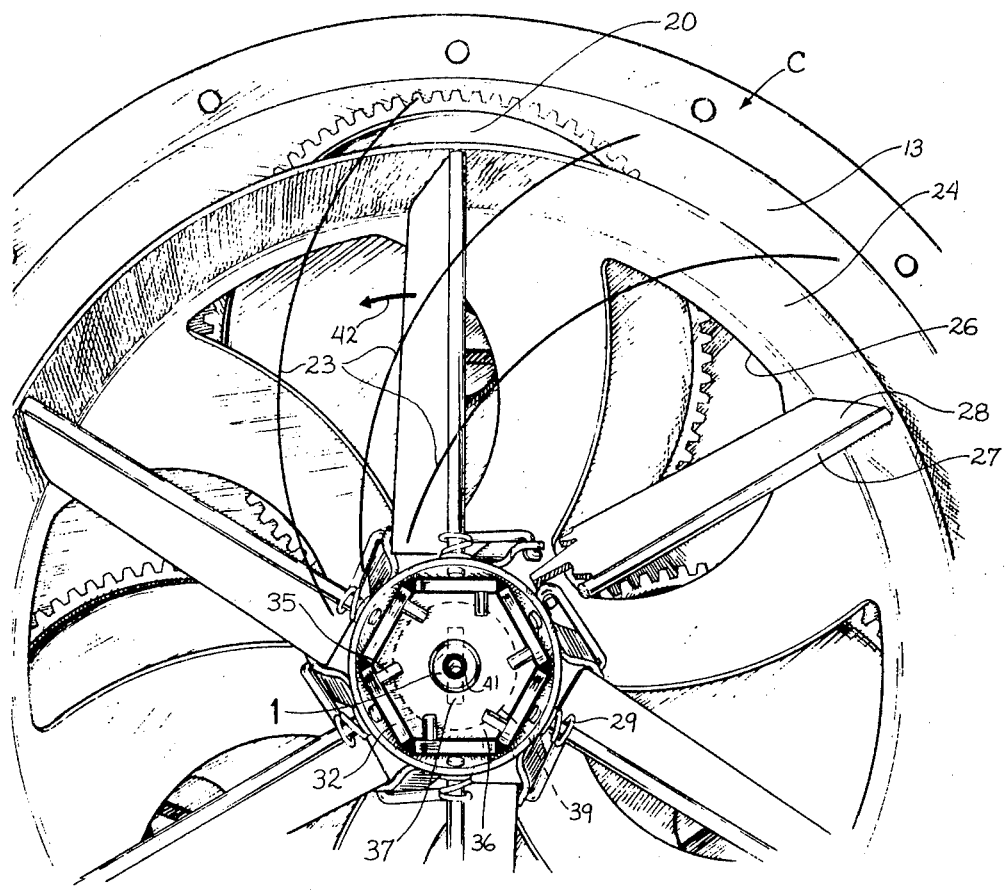
FIG. 2 is an elevation showing the internal elements and looking towards the planetary gears.

A plurality of L-shape fins 23 are fixed edgewise against the internal face of the axial side 14 and the peripheral rim 15 of the casing and spirally extend relative to the axis of rotation of the casing, as shown in FIG. 2 by spiral lines 23. An annular inner half casing 24 is secured by screws 24' to a flange of the first output gear 21 to rotate with the latter, but is rotatably engaged around the spindle 1, being supported at its end by cup-shaped washer 25, also rotatable on spindle 1. The bottom of half casing 24 has a series of openings 26 and the half casing fully opens adjacent the radial portions of fins 23. A plurality of radial shafts 27 are rotatably mounted in the edge portions of half casing 24. A blade 28 is fixed at one edge to each shaft 27 and is coextensive with half casing 24 when axially extending. A coil spring 29 surrounds each shaft 27 between the radially inner edge of half casing 24 and the blade 28 to urge the latter radially outwardly to be flush with the radially outer part of half casing 24. Each blade 28 is adapted to closely register with the radial legs 23' of the fins 23 upon rotation with the carrier. The blades 28 are rotatable each about its shaft 27 to be angularly adjusted around the radial axes defined by the shafts for selective angular adjustment relative to the above-mentioned radial legs 23' of the fins with their shaft edge always remaining close to said radial legs 23'. As will be readily understood by anyone skilled in the art, when there is a torque converter fluid or liquid, like oil, in the casing, this angular adjustment allows to vary the torque converting action of the blades on the fins.

A selective speed control system is provided to produce the afore-mentioned angular adjustment of the blades 28. This speed control system includes for each blade 28, an arm 30 secured by a bolt 31 to a disc 32 which has a central stud shaft 33 extending through the center of the radially inner flange of half casing 24. The rigid assembly of arm 30 and disc 32 pivots about a radial axis relative to half casing 24. A link 34 (FIGS. 3 and 4) pivotedly connects blade 28 to the outer end of arm 30. An eccentric pin 35 projects from the inner face of disc 32 towards spindle 1. A pair of plates 36 forming flat guide members are rotatably engaged around the slotted portion of the spindle 1. Each guide member of plate 36 is of polygonal outline defining straight edge portions around the periphery thereof engaging with the inner face of the discs 32. The eccentric pins 35 are all sandwiched between the guide members or plates 36.

A flat U-shape clamp 37 is engaged in the slot 4 and includes a pair of legs 38 operatively restraining the guide plates 36 and associated washers 39 against the interposed eccentric pins 35. The legs 38 have facing shoulders 40 at their outer edges, which engage washers 39. The inner edges of legs 38 form internal screw threads for screwing of a threaded pin 41 axially between these legs, thus spreading them apart in clamping engagement with the guide plates 36 and washers 39. Means (not shown) are connected to the threaded pin 41 to cause axial displacement of the pin 41 and, consequently, of the clamp 37 and the guide plates 36. Thus, the eccentric pins 35 can be selectively displaced axially of the spindle 1 producing equal rotation of the blades 28 about shafts 27. The blades 28 may thus be angularly adjusted from a maximum speed position, corresponding to a small angle with the spindle 1, (see FIG. 3), and a neutral position at right angles to the spindle (see FIG. 4).

It must be noted that the input gear 19, the planet carrier 6, the planet gears 20 and the first and the second output gears 21 and 22 form a planetary gear system which is housed inside the casing, except the input gear 19. A neat and self-lubricated arrangement is thus produced, since the torque converter oil surrounds the internal gears.

Upon rotation of the input gear or sprocket 19, such as by the bicycle chain upon pedalling, the planet carrier is directly driven. At the start, the ground resistance on the wheel produces faster rotation of the first output gear 21 and of the blades 28 than the casing C and in the same direction as the latter. The torque converting action of the blades 28 on the fins 23 tends to gradually accelerate the casing C to the same speed as the input gear or sprocket 19. As aforemention the optimal torque exerted on the wheel or wheel hub may be obtained by angular adjustment of the blades about the shafts 27.

Figure 3:
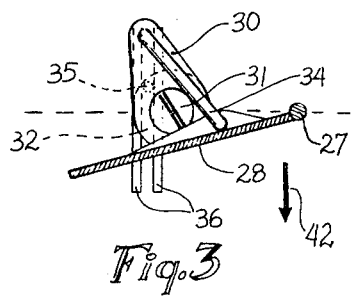
FIGS. 3 and 4 are cross-sections of one blade and plan view of its angular control, shown in two limit positions.
Figure 4:
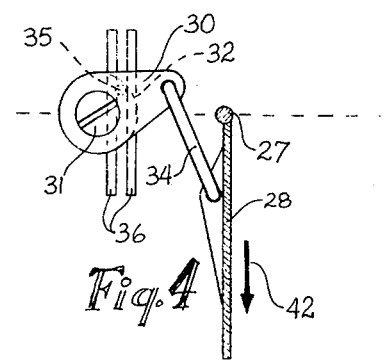

The blades 28 rotate in the direction indicated by arrow 42 in FIGS. 2, 3, and 4. The oil flows in the direction indicated by arrows 42' in FIG. 1. As shown, the oil flows centrifugally along the concave faces of the radial legs 23' of fins 23.

FIGS. 5 and 6 show a second embodiment of the invention which is characterized by the fact that the adjustable blades are pivoted about an axis which is parallel to the axis of the spindle instead of being in a plane perpendicular to it. The spindle 1' is similar to the spindle 1 of the first embodiment and a casing C' is mounted for rotation on the same, said casing being similar to the casing of the first embodiment and including flanges 16' for attaching the radially inner ends of the wires of a bicycle wheel, the casing forming the hub of the wheel. The casing C' is in fluid-tight rotational engagement with the spindle, as in the first embodiment, so as to contain and be filled with a torque converting fluid, such as hydraulic oil. The planetary gear system comprises, as in the first embodiment, planetary gears 20, schematically shown, and engaging the first output gear 21' rotatably mounted on the spindle and the second output gear 22' fixed to the inside of casing rim 15'. The casing is provided with a plurality of angularly equally spaced fins 23a, which are L-shaped in plan view, as in the first embodiment, but which are longitudinally curved spirally, as shown in FIG. 6, but with their concave side facing in the direction of rotation of the wheel hub, or casing, this rotational direction being indicated by arrow 42 in FIG. 6.

A spool-shaped member 43 is located within the casing C' and includes two spaced parallel flanges 44 and 45, respectively, of annular shape and interconnected by a cylindrical base member 46, the latter secured to a flange 47 of the output gear 21' and to a cup-shaped washer 25' rotatably surrounding the spindle 1'. A plurality of equally angularly spaced blades 28' are arranged between the two flanges 44 and 45 and are substantially co-extensive with the cross-sectional area of the space defined by said two flanges, being pivoted along the outer edge of the blades by means of a pivot 48 carried by the radially outer end of a radially extending arm 49. Pivot 48 serves as a blade shaft for its associated blade 28'.

The pivot 48 is parallel to the axis of spindle 1'. The radial arm 49 is pivoted at its radially inner end to a bracket 50 secured to the cylindrical base member 46. A pair of links 52 are pivoted at 51 to intermediate points on both sides of blades 28'. The other ends of links 52 are pivoted at 53 to the adjacent flanges 44 and 45 respectively of the spool-shaped member 43.

Pivotal movement of the radial arm 49 in a plane perpendicular to the spindle axis causes pivotal movement of the blades 28' about their pivots 48 and simultaneous translation of the blades, so that each may taken equal angular adjusted positions between two limit positions shown at 28a and 28b in FIG. 6.

The position 28a is the full sweep high speed transmission position wherein the blades are substantially radial, while the position 28b is a no-sweep, neutral position.

The intermediate position 28c, shown in full line in FIG. 6, corresponds to a half-sweep position or low speed, greater torque efficiency, transmission position. It is obvious that in the position 28a, a maximum amount of transmission fluid is swept by the rotating blades and directed towards the convex side of fixed fins 23' to impinge thereupon. In the neutral position, practically no fluid is forced in the direction of rotation 42 by the blades 28'.

It will be noted that in the neutral position of the blades, their curved front face 54 is flush with the periphery of the flanges 44 and 45, so as to clear the lateral legs of the fins 23'.

The angular control of the radial arms 49 is effected through a link 55 pivotally attached at one end to an intermediate portion of the radial arm 49, and at the other end to a crank-shaped shaft 56 providing an eccentric pin 57 corresponding to the eccentric pin 35 of the first embodiment and sandwiched between the two guide plates 36 axially shiftable relative to the spindle 1' by mechanism identical to that of the first embodiment and including the control pin 41.

The flange 45 is provided with a plurality of equally angularly spaced openings 58 for the return of the transmission fluid. These openings are formed by struck-out portions of the flange 45 defining forwardly inclined scoops 59. Thus, the transmission fluid circulates in accordance with the arrows 60 in FIG. 5.

In the second embodiment, it will be noted that the oil flows centripetally along the convex faces of the radial legs of the fins 23a.

I claim:

1. A hydraulic torque converting wheel comprising a liquid-tight casing operatively containing a hydraulic torque converter liquid, a planetary gear system including a rotary input drive, a planet carrier, planet gears rotatably carried by the latter, a sun gear and a ring gear directly meshing with each of the planet gears independently of each other, said ring gear being secured to said casing, the rotary input drive being secured to the planet carrier for bodily rotation thereof, said planet gears having a greater diameter than that of said sun gear, fins rigidly secured to and inside the liquid-tight casing for bodily rotation with the latter, blades rotatably mounted inside said casing and radially projecting toward operative edgewise registry with the fins, a carrier for said blades rigidly secured to said sun gear for bodily rotation therewith and having said blades angularly adjustable thereon relative to said fins to vary the torque converting relationship with the latter, and a manually-operated remote control system connected to said blades and constructed and arranged to selectively angularly adjust the latter to any desired torque converting relationship of the blades relative to the fins, and to positively maintain said blades in angularly adjusted position despite the action of centrifugal force and/or fluid pressure exerted on said blades, said casing including a peripheral rim and cooperatively forming with the latter a hollow hub, a spindle rotatably carrying said hollow hub, and said liquid-tight casing having axially opposite annular sides centrifugally sealed around the spindle, and wherein said fins include each a main portion extending axially of said spindle and radially relative to the axis of rotation of said casing, shafts are carried by the blade carrier, and said blades are mounted on said shafts respectively and angularly adjustable around the axes defined by the latter for selective angular adjustment relative to said main portion of the fins.

2. A hydraulic torque converting wheel as defined in claim 1, wherein said shafts are each located along one edge of said blades, and, when rotating with said blade carrier, move in a path contiguous with an edge of each fin.

3. A hydraulic torque converting wheel as defined in claim 2, wherein said blade carrier forms an annular half casing coaxially surrounding said spindle, including a radially extending bottom wall and substantially cylindrical radially outer and radially inner side walls and opening laterally away from said bottom wall, said shafts being rotatably mounted at the free edge of said side walls, said blades, when angularly adjusted to lie in a plane coaxial with said spindle being substantially coextensive with the cross-sectional area of said half-casing on one side of the spindle axis, said half casing bottom wall having a large opening for liquid circulation.

4. A hydraulic torque converting wheel as claimed in claim 3, wherein said blade shafts and the contiguous edges of said fins are disposed along frusto-conical surfaces of revolution.

5. A hydraulic torque converting wheel as defined in claim 1, wherein each fin further includes a lateral portion extending axially of the spindle and forming a lateral extension at the outer end of the associated main portion.

6. A hydraulic torque converting wheel as claimed in claim 1, wherein said blade shafts are substantially parallel to the spindle axis.

7. A hydraulic torque converting wheel as claimed in claim 6, further including, for each blade, a radially extending arm pivoted to the blade carrier at its inner end for pivotal movement in a plane perpendicular to the spindle axis and carrying the blade shaft at its outer end, links interconnecting an intermediate point of said blades and said carrier, whereby pivotal movement of said arm causes translational movement of said blade shaft and simultaneous pivotal movement of said blade around said blade shaft, so as to angularly adjust said blade.

8. A hydraulic torque converting wheel as claimed in claim 5, wherein the major portion of said fins is spiral shaped, and each fin includes a lateral portion extending from the radially outer end of said main portion, axially of said spindle, and having a radially inner edge substantially coaxial with the spindle axis, the radially outer edge of said blades moving in a path contiguous with said inner edges of said lateral portions.

9. A hydraulic torque converting wheel as defined in claim 2, wherein said control system includes, for each blade, a stud shaft rotatably carried by said blade carrier for rotation about a radial axis, linkage means connecting said stud shaft to the related blade for angular adjustment of the latter by rotation of the stud shaft, each stud shaft having an eccentric pin projecting towards the spindle axis, a pair of spaced-apart guide members embracing all of said eccentric pins, surrounding said spindle, rotatable thereon and axially shiftable relative to the same, a clamping member axially restraining the guide members in predetermined spaced-apart relationship and itself axially shiftable on the spindle together with said guide members, and a push pull link connected to said clamping member and axially controlling the axial position of the latter and of said eccentric pins along the spindle axis and thus the angular position of all of said blades.

10. A hydraulic torque converting wheel as defined in claim 9, said planet carrier includes a hub portion projecting outwardly of the liquid-tight casing, said input drive having a pinion fixedly secured to said outwardly projecting hub portion, said planet gears, sun gear and ring gear, the carrier for said blades and the control system are enclosed in the liquid-tight casing, said sun gear is rotatable on said spindle, said ring gear being secured to said gear casing against the internal side thereof, said spindle has an axially open end and a diametrical slot communicating with the inner portion of said open end, a disc is secured to the radially inner end of each of said stud shafts and defines an inner face having the corresponding pin projecting therefrom, each of said guide members has straight edge portions around the periphery thereof operatively engaging with the inner face of said discs to be rotated by the latter relative to the spindle, said clamping member constitutes a flat U-shaped clamp engaging within said diametrical slot and including a pair of legs extending through said guide members and having inner screw threads, and said push pull link includes a threaded pin engaging said inner screw threads and outwardly forcing said legs in operative engagement with the guide members.

11. A transmission for a bicycle and the like having a power-actuated wheel, comprising a liquid-tight casing forming a hub for said wheel and operatively containing a hydraulic torque converter liquid, a planetary gear system including a rotary input drive, a planet carrier, planet gears rotatably carried by the latter, a sun gear and a ring gear directly meshing with each of the planet gears independently of each other, said ring gear being secured to said casing, the rotary input drive being secured to the planet carrier for bodily rotation thereof, said planet gears having a greater diameter than that of said sun gear, fins rigidly secured to and inside the liquid-tight casing for bodily rotation with the latter, blades rotatable mounted inside said casing and radially projecting toward operative edgewise registry with the fins, a carrier for said blades rigidly secured to said sun gear for bodily rotation therewith and having said blades angularly adjustable thereon relative to said fins to vary the torque converting relationship with the latter, and a manually-operated remote control system connected to said blades and constructed and arranged to selectively adjust the latter to any desired torque converting relationship of the blades relative to the fins and to positively maintain said blades in angularly adjusted position despite the action of centrifugal force and/or fluid pressure exerted on said blades.

12. A transmission as defined in claim 11, wherein said casing includes a peripheral rim and axially opposite annular sides and a spindle rotatably carries said casing, said planet carrier including a hub portion projecting outwardly of the casing, the opposite annular sides of said casing being centrally sealed around said hub portion, said rotary input drive being a pinion fixedly secured to said outwardly projecting hub portion, said planet gears, said ring gear and said sun gear, the carrier for said blades and the control system being enclosed in the liquid-tight casing, said sun gear being rotatable on said spindle and said ring gear being secured to said casing at the internal side thereof.

* * * * *